(12) United States Patent
Bhattad et al.

(10) Patent No.: US 8,983,389 B2
(45) Date of Patent: Mar. 17, 2015

(54) METHOD AND APPARATUS FOR SWITCHING BETWEEN SINGLE USER DETECTION AND MULTI USER DETECTION

(75) Inventors: Kapil Bhattad, San Diego, CA (US); Peter Gaal, San Diego, CA (US); Alexei Yurievitch Gorokhov, San Diego, CA (US); Juan Montojo, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 375 days.

(21) Appl. No.: 13/009,174

(22) Filed: Jan. 19, 2011

(65) Prior Publication Data

US 2012/0021688 A1    Jan. 26, 2012

Related U.S. Application Data

(60) Provisional application No. 61/296,720, filed on Jan. 20, 2010.

(51) Int. Cl.
*H04B 1/00* (2006.01)
*H04B 7/04* (2006.01)
*H04B 7/06* (2006.01)
*H04B 7/08* (2006.01)

(52) U.S. Cl.
CPC ............ *H04B 7/0452* (2013.01); *H04B 7/0689* (2013.01); *H04B 7/0871* (2013.01)
USPC ..................... 455/63.1; 455/67.11; 455/67.13

(58) Field of Classification Search
USPC .............. 455/127.1, 63.1, 69, 562.1, 62, 507, 455/452.1, 561, 452.2, 101, 423, 67.11, 455/450, 454, 343.4, 132, 185.1; 370/329, 370/352, 252, 312, 335, 230, 332, 345, 468, 370/342, 334, 338, 328, 319, 208, 203; 375/259, 260, 267, 216, 295, 347, 221, 375/299
See application file for complete search history.

(56) References Cited

U.S. PATENT DOCUMENTS 6,195,534 B1    2/2001  Sakoda et al.
6,832,080 B1 *  12/2004 Arslan et al. .................. 455/296
(Continued)

FOREIGN PATENT DOCUMENTS

JP          3797510 B2    7/2006
JP       2008278341 A    11/2008
(Continued)

OTHER PUBLICATIONS

International Search Report and Written Opinion—PCT/US2011/021937—ISA/EPO—May 4, 2011(100776WO).
(Continued)

*Primary Examiner* — Golam Sorowar
(74) *Attorney, Agent, or Firm* — Liem T. Do (57) ABSTRACT

Certain aspects of the present disclosure propose methods and apparatuses for detecting whether a user device is scheduled for a single user (SU) multiple-input multiple-output (MIMO) communication mode or for a multi-user (MU) MIMO communication mode. In an aspect, a method for wireless communications is provided which includes measuring, at a first apparatus based on received pilot signals, a first receive power corresponding to a first channel associated with the first apparatus, measuring, based on the received pilot signals, a second receive power corresponding to a second channel associated with at least one potentially present second apparatus, measuring a residual interference based on the received pilot signals, and determining, based on at least one of the first receive power, the second receive power and the residual interference, whether to apply a MU detection or a SU detection for estimating data received at the first apparatus.

32 Claims, 7 Drawing Sheets

(56) References Cited

U.S. PATENT DOCUMENTS

| | | | |
|---|---|---|---|
| 2003/0125040 A1* | 7/2003 | Walton et al. | 455/454 |
| 2005/0271170 A1* | 12/2005 | Khayrallah | 375/346 |
| 2009/0323796 A1* | 12/2009 | Futatsugi et al. | 375/232 |
| 2010/0142461 A1 | 6/2010 | Miki et al. | |
| 2010/0296459 A1 | 11/2010 | Miki et al. | |

FOREIGN PATENT DOCUMENTS

| | | |
|---|---|---|
| WO | WO0145289 A1 | 6/2001 |
| WO | WO030041300 A1 | 5/2003 |
| WO | 2005029723 A1 | 3/2005 |
| WO | WO-2008123024 A1 | 10/2008 |

OTHER PUBLICATIONS

QUALCOMM Inc: "Transparent vs. non-transparent MU-MIMO operation", 3GPP Draft; R1-100682 SU-MU Transparency, 3rd Generation Partnership Project (3GPP), Mobile Competence Centre ; 650, Route Des Lucioles ; F-06921 Sophia-Antipolis Cedex ; France, vol. RAN WG1, No. Valencia, Spain; 20100118, Jan. 12, 2010, XP050418274, [retrieved on Jan. 12, 2010] p. 3.

Research In Motion et al: "On Downlink Single Cell MU-MIMO in LTE-A", 3GPP Draft; R1-094458(RIM-Downlink Single Cell MU-MIMO in LTE-A), 3rd Generation Partnership Project (3GPP), Mobile Competence Centre ; 650, Route Des Lucioles ; F-06921 Sophia-Antipolis Cedex ; France, No. Jeju; 20091109, Nov. 9, 2009, XP050388884, [retrieved on Nov. 9, 2009] p. 3.

Zhang Y., et al., "Array Processing for Nonstationary Interference Suppression in DS/SS Communications using Subspace Projection Techniques", IEEE Transactions on Signal Processing, vol. 49, Issue 12, pp. 3005-3014 Dec. 31, 2001.

Taiwan Search Report—TW100102163—TIPO—Aug. 2, 2013 (100776TW).

* cited by examiner

METHOD AND APPARATUS FOR SWITCHING BETWEEN SINGLE USER DETECTION AND MULTI USER DETECTION

CROSS-REFERENCE

The present application for Patent claims priority to U.S. Provisional Patent Application Ser. No. 61/296,720, entitled, "Switching between SU-MIMO and MU-MIMO detector," filed Jan. 20, 2010, and assigned to the assignee hereof and hereby expressly incorporated by reference herein.

BACKGROUND

1. Field

Certain aspects of the present disclosure generally relate to wireless communications and, more particularly, to a method and apparatus for detecting whether a user terminal is scheduled for single user (SU) multiple-input multiple-output (MIMO) communication mode or multi-user (MU) MIMO communication mode.

2. Background

In multi-antenna wireless communication systems, spatial multiplexing can be used to increase spectral efficiency. The spatial multiplexing refers to transmitting multiple streams (typically independently encoded data) along different beams. A beam can be defined by appropriate scaling of amplitude and phase of a signal corresponding to each antenna. A signal is considered to be transmitted along a particular beam if the signal is transmitted on one or more antennas using scaling that corresponds to that beam.

The spatial multiplexing scheme can be referred to as single-user (SU) multiple-input multiple-output (MIMO) scheme when all transmitted streams are dedicated for a single user. On the other hand, the spatial multiplexing scheme can be referred to as multi-user (MU) MIMO when a plurality of streams are transmitted while at least two of the streams are dedicated for two different users.

SUMMARY

Certain aspects of the present disclosure provide a method for wireless communications. The method includes measuring, at a first apparatus based on received pilot signals, a first receive power corresponding to a first channel associated with the first apparatus; measuring, based on the received pilot signals, a second receive power corresponding to a second channel associated with at least one potentially present second apparatus; measuring a residual interference based on the received pilot signals; and determining, based on at least one of the first receive power, the second receive power and the residual interference, whether to apply a multi-user (MU) detection or a single-user (SU) detection for estimating data received at the first apparatus.

Certain aspects of the present disclosure provide an apparatus for wireless communications. The apparatus includes at least one processor configured to: measure, based on received pilot signals, a first receive power corresponding to a first channel associated with the apparatus; measure, based on the received pilot signals, a second receive power corresponding to a second channel associated with at least one potentially present other apparatus; measure a residual interference based on the received pilot signals; and determine, based on at least one of the receive power, the other receive power and the residual interference, whether to apply a multi-user (MU) detection or a single-user (SU) detection for estimating data received at the apparatus. The apparatus further includes memory coupled to the at least one processor.

Certain aspects of the present disclosure provide an apparatus for wireless communications. The apparatus includes means for measuring, based on received pilot signals, a first receive power corresponding to a first channel associated with the apparatus; means for measuring, based on the received pilot signals, a second receive power corresponding to a second channel associated with at least one potentially present other apparatus; means for measuring a residual interference based on the received pilot signals; and means for determining, based on at least one of the first receive power, the second receive power and the residual interference, whether to apply a multi-user (MU) detection or a single-user (SU) detection for estimating data received at the apparatus.

Certain aspects of the present disclosure provide a computer-program product for wireless communications. The computer-program product includes a computer-readable storage medium comprising instructions for causing a computer to measure, at a first apparatus based on received pilot signals, a first receive power corresponding to a first channel associated with the first apparatus; instructions for causing the computer to measure, based on the received pilot signals, a second receive power corresponding to a second channel associated with at least one potentially present second apparatus; instructions for causing the computer to measure a residual interference based on the received pilot signals; and instructions for causing the computer to determine, based on at least one of the first receive power, the second receive power and the residual interference, whether to apply a multi-user (MU) detection or a single-user (SU) detection for estimating data received at the first apparatus.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Certain aspects of the present disclosure are related to single carrier frequency division multiple access (SC-FDMA) transmission technique, which utilizes single carrier modulation at a transmitter and frequency domain equalization at a receiver. The SC-FDMA has similar performance and essentially the same overall complexity as the OFDMA. Main advantage of the SC-FDMA is that the SC-FDMA signal provides a lower peak-to-average power ratio (PAPR) than the OFDMA signal because of its inherent single carrier structure. The SC-FDMA technique has drawn great attention, especially in the uplink communications where lower PAPR greatly benefits a mobile terminal in terms of transmit power efficiency. This technique is currently utilized as the uplink multiple access scheme in 3GPP LTE, or Evolved UTRA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless nodes may provide, for example, connectivity for or to a network (e.g., a wide area network such as the Internet or a cellular network) via a wired or wireless communication link.

Figure 1:
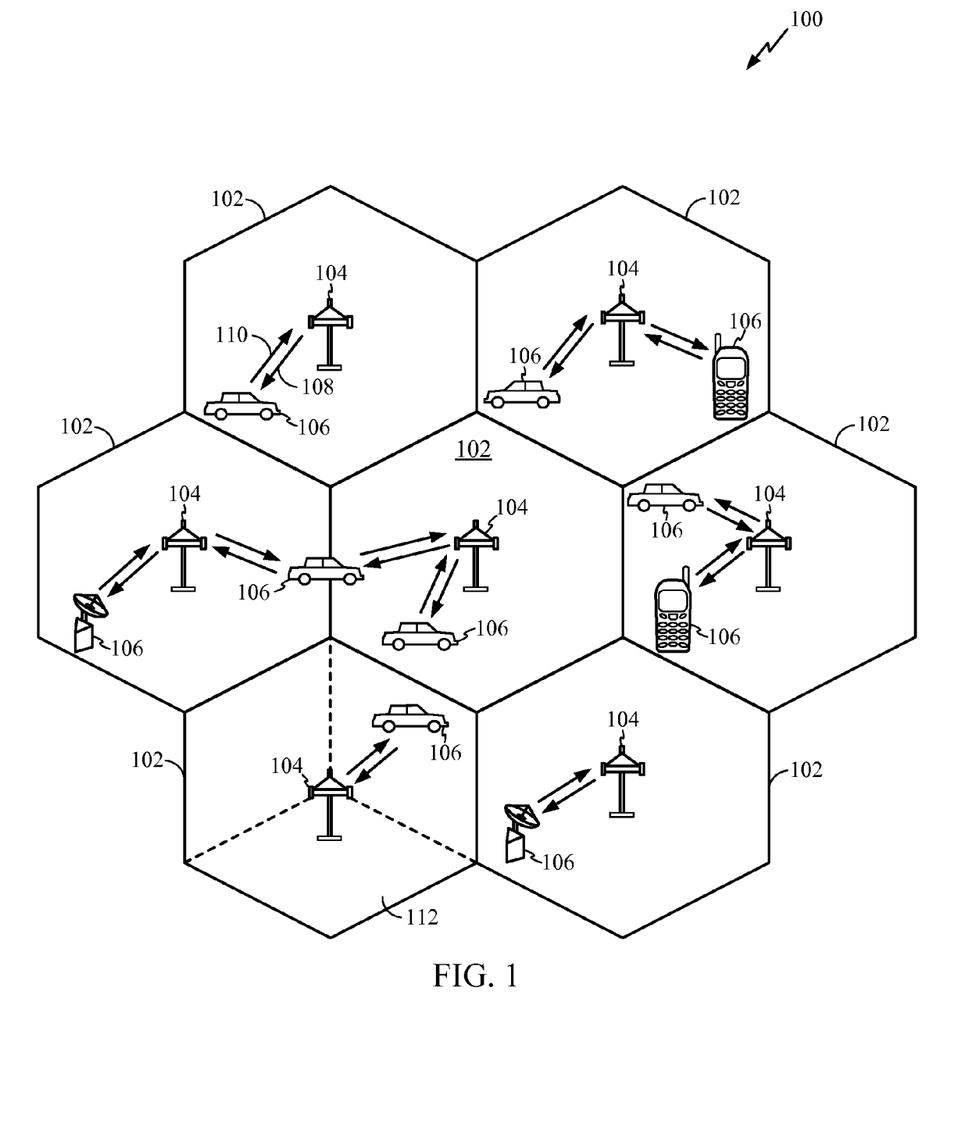
FIG. 1 illustrates an example wireless communication system in accordance with certain aspects of the present disclosure.

FIG. 1 illustrates an example of a wireless communication system 100 in which aspects of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a node, a Node B, an evolved Node B (eNode B), or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be transmitted and received between the base stations 104 and the user terminals 106 in accordance with OFDM/OFDMA techniques. If this is the case, the wireless communication system 100 may be referred to as an OFDM/OFDMA system. Alternatively, signals may be transmitted and received between the base stations 104 and the user terminals 106 in accordance with the SC-FDMA technique. If this is the case, the wireless communication system 100 may be referred to as a SC-FDMA system.

A communication link that facilitates transmission from the base station 104 to the user terminal 106 may be referred to as a downlink (DL) 108, and a communication link that facilitates transmission from a user terminal 106 to a base station 104 may be referred to as an uplink (UL) 110. Alternatively, the downlink 108 may be referred to as a forward link or a forward channel, and the uplink 110 may be referred to as a reverse link or a reverse channel.

The cell 102 may be divided into multiple sectors 112. A sector 112 is a physical coverage area within the cell 102. Base stations 104 within the wireless communication system 100 may utilize antennas that concentrate the flow of power within a particular sector 112 of the cell 102. Such antennas may be referred to as directional antennas.

In an aspect of the present disclosure, each user terminal 106 may be configured to receive pilot signals from a serving base station 104. Each user terminal 106 may measure, based on the received pilot signals, a receive power corresponding to a channel associated with that user terminal. Further, that user terminal 106 may be configured to measure, based on the pilot signals, another receive power corresponding to another channel associated with at least one potentially present user terminal simultaneously served by the same base station 104 or a different base station 104 of the wireless communication system 100. In addition, the user terminal 106 may measure a residual interference based on the pilot signals, and determine, based on at least one of the receive power, the other receive power and the residual interference, whether to apply a multi-user (MU) detection or a single-user (SU) detection for estimating transmitted data received at the user terminal 106.

Figure 2:
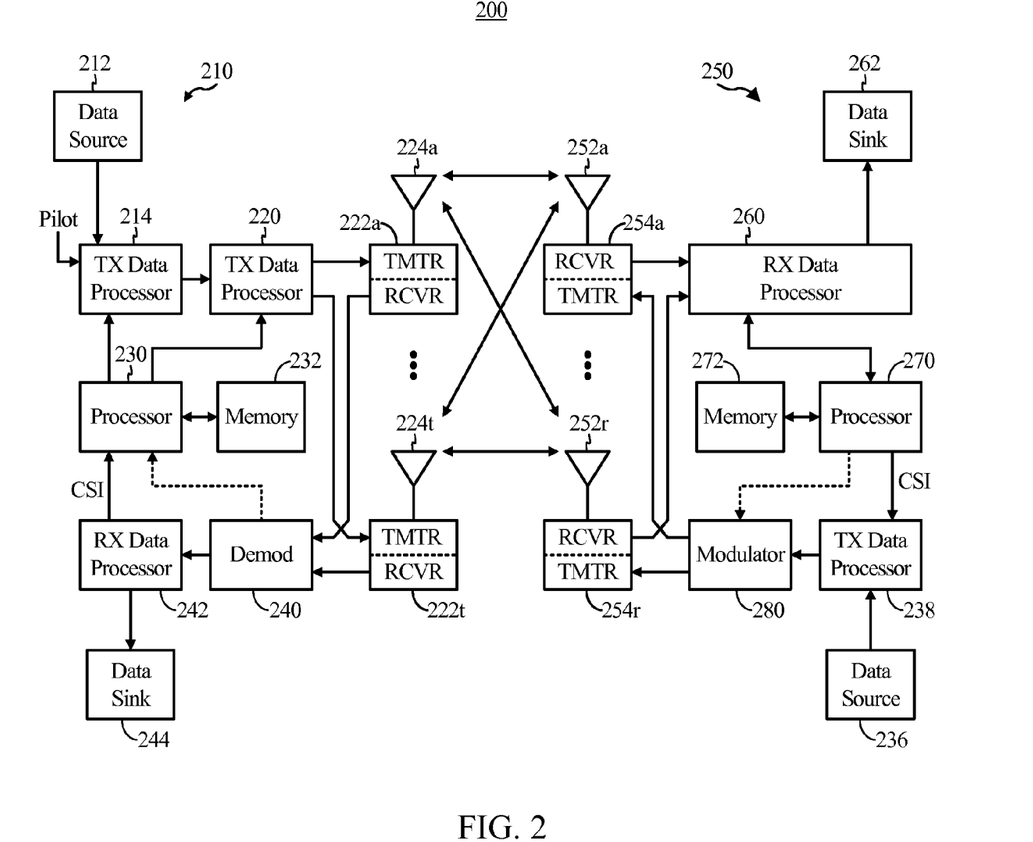
FIG. 2 illustrates a schematic diagram of wireless devices in accordance with certain aspects of the present disclosure.

FIG. 2 illustrates an example wireless network environment 200 in accordance with certain aspects set forth herein. The wireless network environment 200 depicts one base station 210 and one mobile device 250 for sake of brevity. However, it is contemplated that the system 200 can include one or more base stations and/or one or more mobile devices, wherein additional base stations and/or mobile devices can be substantially similar or different from illustrated base station 210 and illustrated mobile device 250 described herein. In addition, it is contemplated that the base station 210 and/or the mobile device 250 can employ the systems, techniques, configurations, aspects, aspects, and/or methods described herein to facilitate wireless communication between them.

At the base station 210, traffic data for a number of data streams is provided from a data source 212 to transmit (TX) data processor 214. In certain aspects, each data stream can be transmitted over a respective antenna and/or over multiple antennas. The TX data processor 214 may format, encode and interleave the traffic data stream based on a particular coding scheme selected for that data stream to provide coded data.

The coded data for each data stream can, for example, be multiplexed with pilot data using orthogonal frequency division multiplexing (OFDM) techniques. Additionally or alternatively, the pilot symbols can be code division multiplexed (CDM) with coded data, frequency division multiplexed (FDM), or time division multiplexed (TDM). The pilot data is typically a known data pattern that is processed in a known manner and can be used at the mobile device 250 to estimate channel response or other communication parameters and/or characteristics. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), and so on) selected for that data stream to provide modulation symbols. The data rate, coding and modulation for each data stream can be determined by instructions performed or provided by processor 230.

The modulation symbols for the data streams can be provided to a TX MIMO processor 220, which can further process the modulation symbols. The TX multiple-input multiple-output (MIMO) processor 220 then provides $N_T$ modulation symbol streams to $N_T$ transmitters (TMTR) 222a through 222t. In certain aspects, the TX MIMO processor 220 applies certain multi-antenna techniques, such spatial multiplexing, diversity coding or precoding (i.e., beamforming, with weights being applied to the modulation symbols of the data streams and to the antenna from which the symbol is being transmitted).

Each transmitter 222 receives and processes a respective modulation symbol stream to provide one or more analog signals, and further conditions (e.g., amplifies, filters, upconverts, etc.) the analog signals to provide a modulated signal suitable for transmission over the MIMO channel. Further, $N_T$ modulated signals from transmitters 222a through 222t are transmitted from $N_T$ antennas 224a through 224t, respectively.

At the mobile device 250, the transmitted modulated signals are received by $N_R$ antennas 252a through 252r, and the received signal from each antenna 252 is provided to a respective receiver (RCVR) 254a through 254r. Each receiver 254 conditions (e.g., filters, amplifies, downconverts, and so on) a respective signal, digitizes the conditioned signal to provide samples, and further processes the samples to provide a corresponding received symbol stream.

A receive (RX) data processor 260 can receive and process the $N_R$ received symbol streams from $N_R$ receivers 254 based on a particular receiver processing technique to provide $N_T$ "detected" symbol streams. The RX data processor 260 can demodulate, de-interleave, and decode (and perform other processing) each detected symbol stream to recover the traffic data for the data stream, and provide the traffic data to a data sink 262. In certain aspects, for the mobile device 250, the processing by RX data processor 260 can be complementary to that performed by the TX MIMO processor 220 and the TX data processor 214 at the base station 210.

A processor 270 can periodically determine which precoding matrix to utilize. Further, the processor 270 can formulate a reverse link message comprising a matrix index portion and a rank value portion. The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to the base station 210.

At the base station 210, the modulated signals from the mobile device 250 are received by the antennas 224, conditioned by respective the receivers 222, demodulated by a demodulator 240, and processed by a RX data processor 242 to extract the reverse link message transmitted by the mobile device 250, and provide the reverse link message to a data sink 244. Further, the processor 230 can process the extracted message to determine which precoding matrix to use for determining the beamforming weights.

The processors 230 and 270 can direct (e.g., control, coordinate, manage, and so on) operation at the base station 210 and the mobile device 250, respectively. The respective processors 230 and 270 can be associated with memory 232 and 272 that store program codes and data. The processors 230 and 270 can also perform computations to derive frequency and impulse response estimates for the uplink and downlink, respectively. All "processor" functions can be migrated between and among processor modules such that certain processor modules may not be present in certain aspects, or additional processor modules not illustrated herein may be present.

The memory 232 and 272 (as with all data stores disclosed herein) can be either volatile memory or nonvolatile memory or can include both volatile and nonvolatile portions, and can be fixed, removable or include both fixed and removable portions. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink™ DRAM (SLDRAM), and direct Rambus™ RAM (DRRAM). The memory 232 and 272 of the certain aspects is intended to comprise, without being limited to, these and any other suitable types of memory.

The mobile device 250 may receive pilot data transmitted from the serving base station 210. In an aspect of the present disclosure, the RX Data processor 260 and/or the processor 270 may measure, based on the received pilot data, a receive power corresponding to a channel associated with the mobile device 250, another receive power corresponding to another channel associated with at least one potentially present mobile device simultaneously served by the same base station 210 or a different base station (not shown), and a residual interference at the mobile device 250. Further, the RX Data processor 260 and/or the processor 270 of the mobile device 250 may determine, based on at least one of the receive power, the other receive power or the residual interference, whether to apply a multi-user (MU) detection or a single-user (SU) detection for estimating transmitted data received at the mobile device 250.

Figure 3:
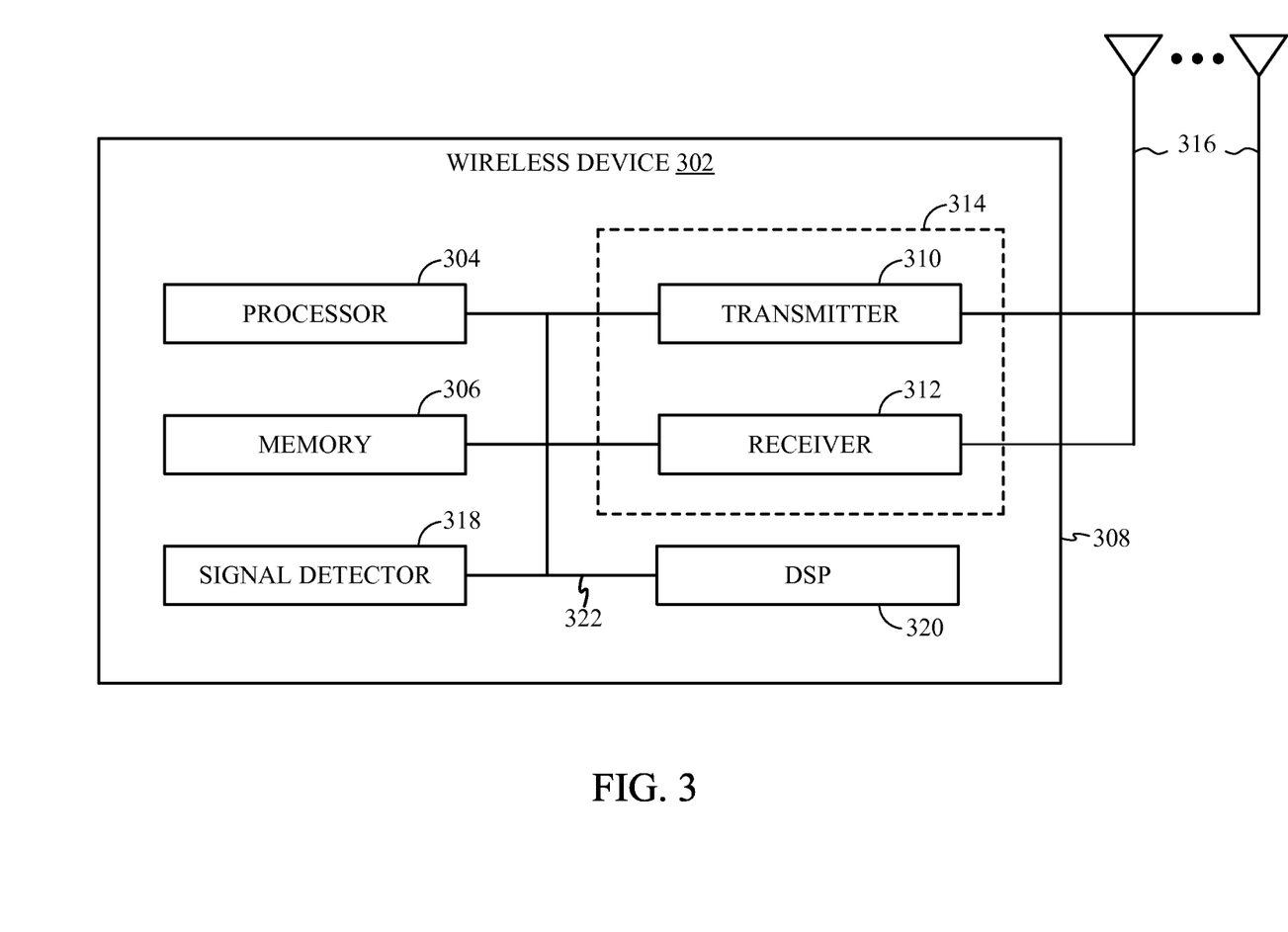
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 104 or any of user terminals 106 in FIG. 1.

The wireless device 302 may include a processor 304 which controls operation of the wireless device 302. The processor 304 may also be referred to as a central processing unit (CPU). A memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods and algorithms described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The wireless device 302 may be configured to receive pilot data transmitted from a serving base station. In an aspect of the present disclosure, the processor 304 may measure, based on the pilot data, a receive power corresponding to a channel associated with the wireless device 302, another receive power corresponding to another channel associated with at least one potentially present wireless device simultaneously served by the same or a different base station, and a residual interference at the wireless device 302. Further, the processor 304 and/or the DSP 320 may determine, based on at least one of the receive power, the other receive power and the residual interference, whether to apply a multi-user (MU) detection or a single-user (SU) detection for estimating data received at the wireless device 302.

The various components of the wireless device 302 may be coupled by a bus system 322, which may include a power bus, a control signal bus, and a status signal bus in addition to a data bus.

In multi-antenna wireless communication systems (such as the system 100 illustrated in FIG. 1 and the system 200 illustrated in FIG. 2), spatial multiplexing may be utilized to increase spectral efficiency. The spatial multiplexing refers to transmitting multiple streams (typically independently encoded data) along different beams. The spatial multiplexing scheme can be referred to as single user multiple-input multiple-output (SU-MIMO) scheme when all transmitted streams are dedicated for a single user, and it can be referred to as multi-user (MU) MIMO when two or more streams are transmitted where at least two streams are dedicated for two different users.

In Long Term Evolution (LTE) Release 9 specification, user equipments (UEs) that are configured for UE-specific reference signal (UE-RS) decoding may not have knowledge if they are scheduled in, for example, rank 1 SU-MIMO communication mode or in rank 1 MU-MIMO communication mode. Each supported UE (e.g., the UE 250 from FIG. 2) may utilize different decoders for these two communication modes. Because of that, the UE may be required to accurately detect whether it is associated with the SU communication mode or with the MU communication mode.

For certain aspects of the present disclosure, the UE may utilize received UE-RS pilots for measuring energy in different dimensions and may detect a scheduled communication mode based on the measured energies. For example, the UE may measure at least one of: an energy in a beam dedicated for the UE, an energy in another beam if it exists or a noise in that dimensions if the other beam does not exist, or an energy of ambient noise/interference. Using these estimates, the UE may be able to determine whether it is associated with the SU communication mode or with the MU communication mode.

A mathematical model for the spatial multiplexing scheme may be defined as:

$$Y_{N_R \times 1} = H_{N_R \times N_T} \cdot P_{N_T \times R} \cdot X_{R \times 1} + N_{N_R \times 1}, \qquad (1)$$

where $N_R$ and $N_T$ denote the number of receive and transmit antennas respectively, Y is a received signal, H represents a channel matrix, P is a precoding matrix applied at a transmitter, R denotes a transmission rank, X represents a vector comprising modulated symbols for the R streams and N is an additive noise at a receiver. The dimension of each matrix in equation (1) is specified in a corresponding subscript.

Figure 4:
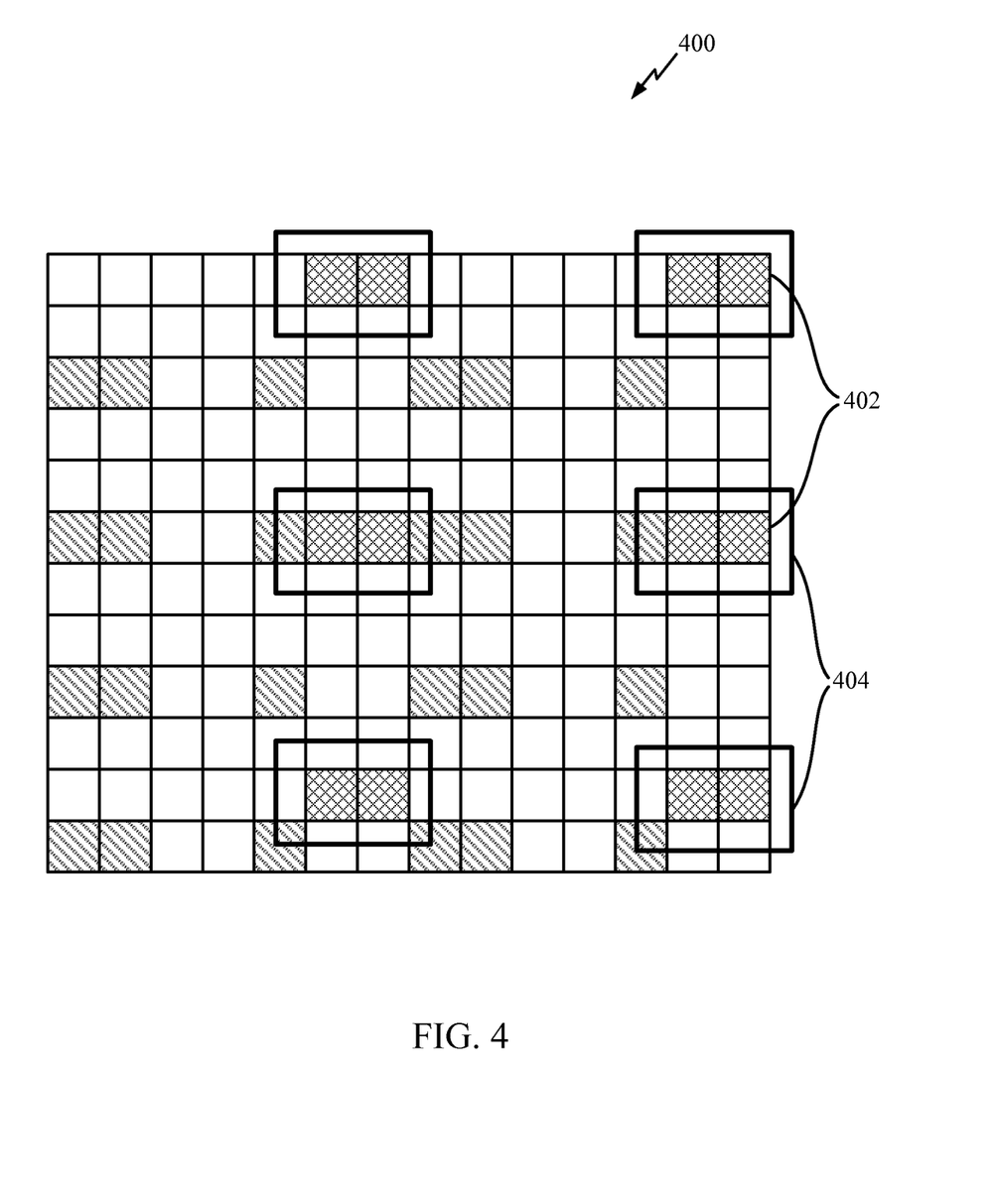
FIG. 4 illustrates an example reference signal pattern with code division multiplexing of two layers in accordance with certain aspects of the present disclosure.

In LTE Release 9, UE may be served by code division multiplexing (CDM) based precoded UE-specific RS and using transparent switching between the SU-MIMO and MU-MIMO communication modes. FIG. 4 illustrates an example UE-RS pattern 400 with CDM of two layers according to certain aspects of the present disclosure. Pilots may occupy resource elements (REs) 402, and pilots of two layers may be spread over two REs in time (as illustrated in FIG. 4 by boxes 404) using orthogonal spreading codes such as {1,1}, {1,−1}. The precoded UE-RS may be employed by the UE to directly estimate the precoded channel H*P defined in equation (1), which may be required for demodulation at the UE. The UE-RS may be also utilized for interference estimation at the UE.

In LTE Release 9, in order to enable transparent switching between the MU-MIMO and SU-MIMO communication modes, a downlink (DL) grant may be specified indicating to the UE one of following three possibilities. In one aspect, the UE may be scheduled with one stream and the corresponding pilots may be transmitted to the UE on UE-RS layer 0. In another aspect, the UE may be scheduled with one stream and the corresponding pilots may be transmitted to the UE on UE-RS layer 1. In yet another aspect, the UE may be scheduled with two streams and the corresponding pilots may be transmitted to the UE on both UE-RS layer 0 and UE-RS layer 1. Therefore, based only on the DL grant, the UE may not be able to differentiate whether it has been scheduled in the rank 1 SU-MIMO mode where only one stream is transmitted and dedicated for the UE, or whether it is scheduled in the MU-MIMO mode where two streams are transmitted and one stream is dedicated for the UE and another stream is dedicated for another UE.

In an aspect of the present disclosure, the UE may choose to implement different types of receivers for the two modes. For example, in the rank 1 SU-MIMO mode, the UE may be required to estimate only a channel for layers assigned to the UE and average interference observed across utilized resource block (RB). Then, the estimated channel and average interference may be used for demodulation at the UE. In the case of MU-MIMO mode, in order to lessen interference from a stream assigned to another UE, the UE may estimate channels for both a stream assigned to the UE and for another stream assigned to the other UE, as well as remaining average interference in that utilized RB. Some advanced receiver algorithm may be then employed at the UE, such as, minimum mean square error (MMSE) detector, MMSE detector with successive interference cancellation (SIC), whitened MMSE detector, and so on.

In an aspect, beamforming coefficients may be required to be constant within the utilized RB, but these coefficients may be different between consecutive RBs. If larger RB aggregation is standardized or information about larger RB aggregation is conveyed from eNB to the UE (i.e., beamforming may be constant over more RBs), then channel estimation for the interferer and for the desired stream may be improved, which may further enhance performance of the MMSE/MMSE SIC based receiver applied at the UE.

Utilizing the SU-MIMO receiver when the UE is scheduled with the MU-MIMO communication mode may lead to some performance loss since the frequency selectivity of the interference due to transmission to the other UE is not used. On the other hand, utilizing the MU-MIMO receiver for the SU-MIMO communication mode may also cause some performance loss since some dimensions may be used for estimating a channel for another UE that does not exist. In addition, complexity of utilizing the MU-MIMO receiver may be also higher than complexity of utilizing the SU-MIMO receiver.

It is proposed in the present disclosure that when the UE is scheduled with one layer for each RB, the UE may be configured to try identifying whether it is associated with the SU-MIMO communication mode or with the MU-MIMO communication mode. Then, different receiver algorithms may be applied at the UE accordingly. The present disclosure also proposes a general algorithm for determining whether the UE is in the SU-MIMO communication mode or in the MU-MIMO communication mode.

The proposed approach may also be extended to the case when the wireless system comprises more than two orthogonal pilots and when the UE may be assigned with more than one layer, but it may still be in the MU-MIMO communication mode. In this case, it may be required to determine if a transmission exists for each of the possible orthogonal pilots not assigned to the UE.

Certain aspects of the present disclosure support detection of the SU-MIMO mode of communication versus the MU-MIMO mode of communication based on energies contained in different signal dimensions, i.e., in a signal space of a potentially co-scheduled UE versus a noise space. More specifically, the detection of communication mode may be based on verifying hypothesis of whether the energy comprised in one or more dimensions corresponding to the co-scheduled UE is greater than the energy residing in the remaining dimensions outside the MU signal space.

Let $P_1$ represents a power corresponding to an effective channel for served UE (e.g., a first beam), $P_2$ may represent a power corresponding to an effective channel for a co-scheduled UE (e.g., a second beam), and N may represent a level of residual interference. The values of $P_1$, $P_2$ and N may be estimated based on received pilots assuming that the co-scheduled UE is present in the system. Based on these estimates, the UE may be able to determine whether to utilize SU-MIMO receiver or MU-MIMO receiver.

In an aspect of the present disclosure, if the ratio $P_2/N$ is greater than a threshold level, then the MU-MIMO receiver may be applied. Otherwise, the SU-MIMO receiver may be utilized. In another aspect, since the gains of using the frequency selective nature of interference in the MU-MIMO communication mode may be larger when signal-to-noise ratio (SNR) is higher, then the MU-MIMO receiver may be utilized only when the ratio $P_1/(P_2+N)$ is greater than a threshold level.

Estimation of $P_1$, $P_2$ and N may depend on an estimated receive power (i.e., SNR), Doppler spread and delay spread properties of a propagating channel, pilot pattern, used spreading sequence, and so on. In one aspect of the present disclosure, the estimator of $P_1$, $P_2$ and N may employ linear projections to the received symbols on pilot locations (e.g., $N_P$ time-frequency locations or dimensions) such that an energy of the first transmission beam may be mostly comprised in first $D_1$ of $N_P$ dimensions (i.e., in a first subspace), while an expected energy from the second transmission beam and noise may be minimized (or at least reduced) along these $D_1$ dimensions. Energy for the second beam may be mostly comprised in next $D_2$ dimensions of Np dimensions (i.e., in a second subspace), while the energy from the first beam and noise may be minimized (or at least reduced) along these $D_2$ dimensions. Then, remaining $N_P - D_1 - D_2$ dimensions (i.e., a third subspace that may be orthogonal to the first and second subspace) may be utilized for estimating residual interference.

In an aspect of the present disclosure, the choice of first subspace may depend on at least one of an estimated SNR associated with a channel along which the first beam is propagated, an estimated Doppler spread of the channel, or an estimated delay spread of the channel. Further, the second subspace may depend on at least one of an estimated SNR associated with another channel along which the second beam is propagated, an estimated Doppler spread of the other channel, or an estimated delay spread of the other channel.

In an aspect of the present disclosure, the estimates of $P_1$, $P_2$ and N may be obtained by applying the aforementioned linear transformations and summing squared norms of pilot signals along appropriate dimensions (i.e., along basis of first, second and third subspace, respectively). Since all projections may be expected to comprise some noise component, the estimates of $P_1$ and $P_2$ may be further refined (updated) by subtracting suitably scaled estimates of the residual interference N.

Figure 5:
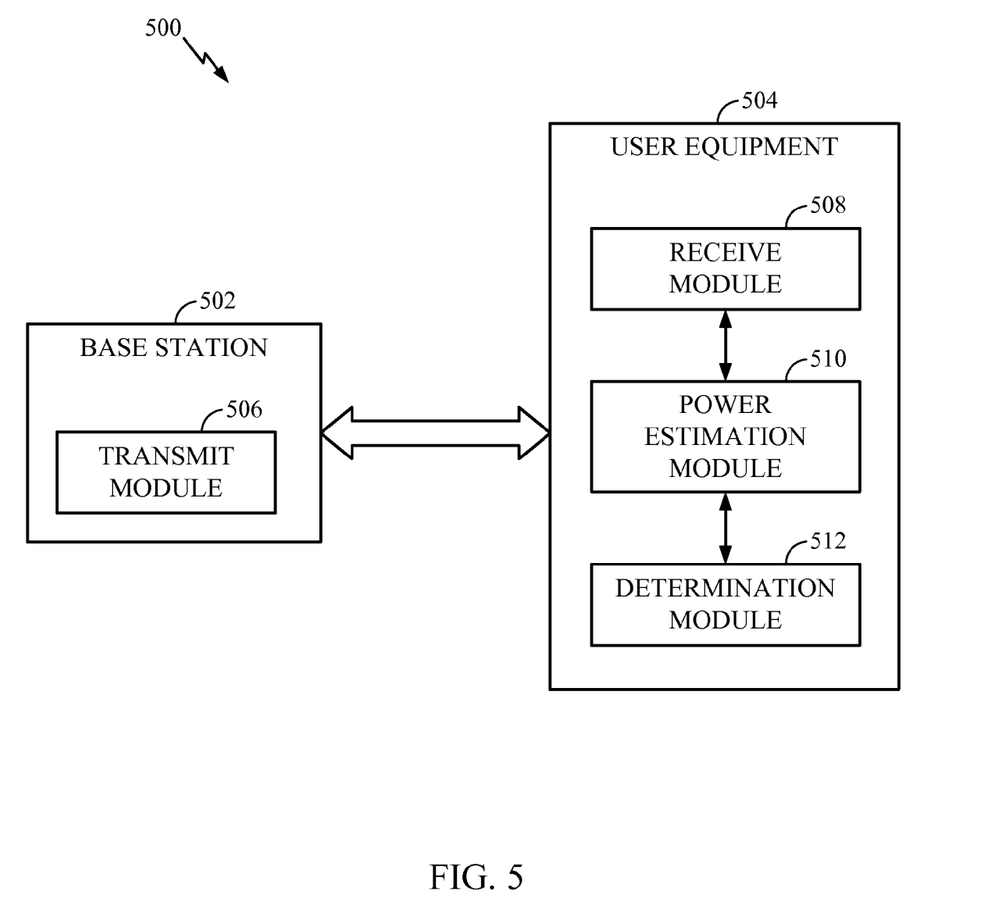
FIG. 5 illustrates an example system for determining whether a user terminal is scheduled for single-user communication mode or multi-user communication mode in accordance with certain aspects of the present disclosure.

FIG. 5 illustrates an example system 500 that facilitates determining whether UE is scheduled for SU MIMO communication or MU MIMO communication in accordance with certain aspects of the present disclosure. The system 500 may comprise a base station 502 (access point, Node B, eNB, and so on) that may communicate with UE 504 (mobile station, mobile device, and/or any number of disparate devices (not shown)). The base station 502 may transmit information to the UE 504 over a forward link channel or downlink channel; further, the base station 502 may receive information from the UE 504 over a reverse link channel or uplink channel. Moreover, the system 500 may be a MIMO system. Additionally, the system 500 may operate in an OFDMA wireless network (such as 3GPP, 3GPP2, 3GPP LTE, and so on). Also, in an aspect, the components and functionalities shown and described below in the base station 502 may be present in the UE 504 and vice versa.

The base station 502 may comprise a transmit module 506 that may be configured to transmit pilot signals to the UE 504, wherein the transmitted pilot signals may be known at the UE 504. The UE 504 may comprise a receive module 508 configured to receive the pilot signals transmitted from the base station 502. The UE 504 may further comprise a power estimation module 510, which may be configured to measure, based on the received pilot signals, a receive power corresponding to a channel associated with the UE 504. The module 510 may be further configured to measure, based on the received pilot signals, another receive power corresponding to other channel associated with at least one potentially present UE scheduled for communication simultaneously with the UE 504. In addition, the module 510 may be also configured to measure residual interference at the UE 504 based on the received pilot signals. The UE 504 may further comprise a determination module 512 that may be configured to determine, based on at least one of the receive power, the other receive power or the residual interference, whether to apply a multi-user (MU) detection or a single-user (SU) detection for estimating transmitted data received at the receive module 508 of the UE 504.

Figure 6:
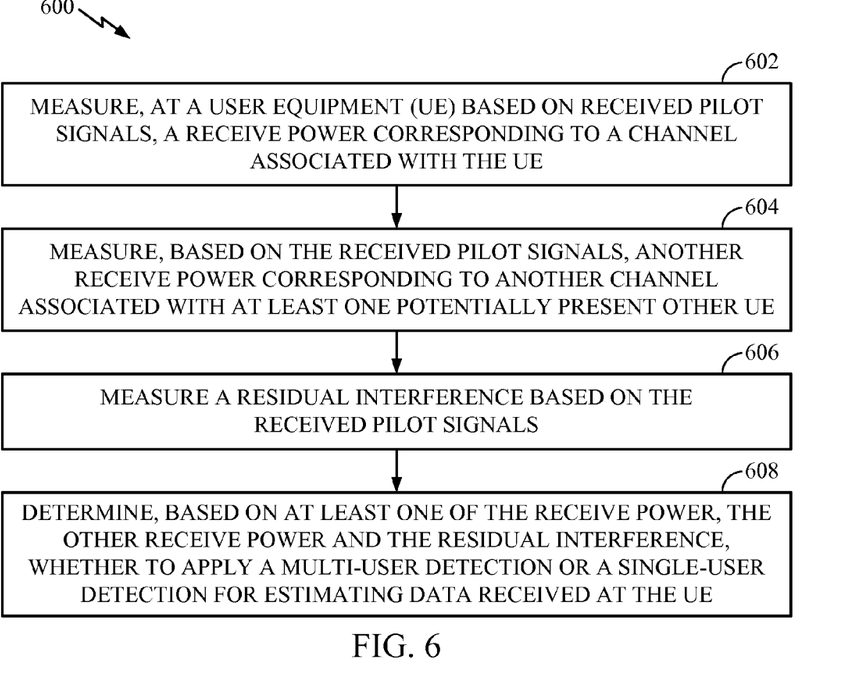
FIG. 6 illustrates example operations that may be performed at a user terminal for detecting single-user communication mode or multi-user communication mode in accordance with certain aspects of the present disclosure.

FIG. 6 illustrates example operations 600 that may be performed at UE for detecting whether the UE is scheduled for SU-MIMO communication mode or MU-MIMO communication mode in accordance with certain aspects of the present disclosure. In one aspect, operations illustrated by the blocks 600 may be performed, for example, at the processor(s) 260 and/or 270 of the access terminal 250 from FIG. 2. In another aspect, operations illustrated by the blocks 600 may be performed, for example, at the processor(s) 304 and/or 320 of the wireless device 302 from FIG. 3. In yet another aspect, operations illustrated by the blocks 600 may be performed, for example, at the modules 508, 510, 512 of the UE 504 from FIG. 5.

As illustrated in FIG. 6, at 602, the UE may measure, based on received pilot signals, a receive power corresponding to a channel associated with the UE. At 604, the UE may measure, based on the received pilot signals, another receive power corresponding to another channel associated with at least one potentially present other UE. At 606, residual interference at the UE may be measured based on the received pilot signals. At 608, the UE may determine, based on at least one of the receive power, the other receive power and the residual interference, whether to apply a MU detection or a SU detection for estimating transmitted data received at the UE.

Figure 6A:
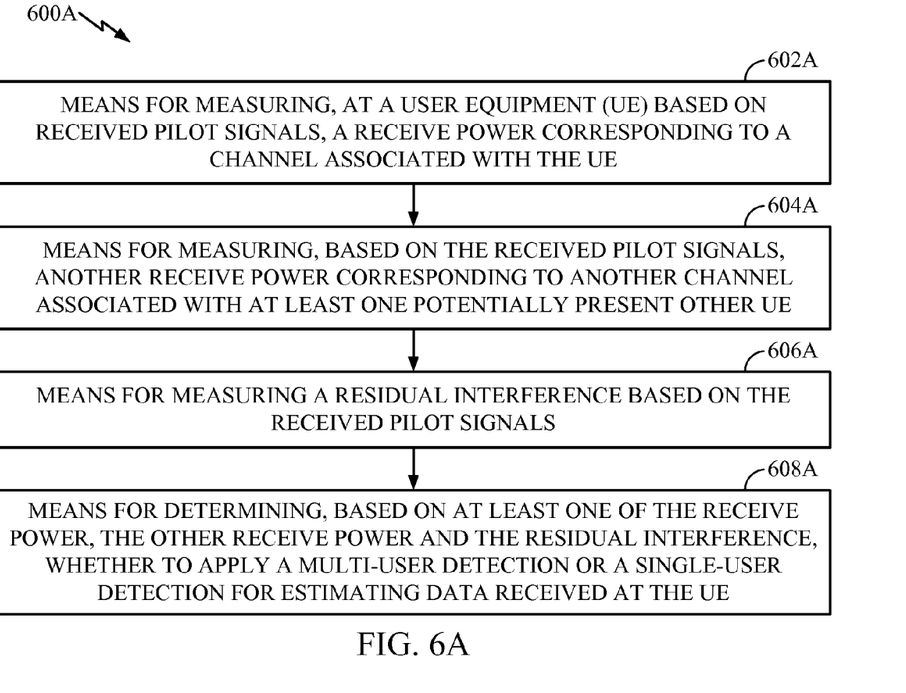
FIG. 6A illustrates example components capable of performing the operations illustrated in FIG. 6.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 600 illustrated in FIG. 6 correspond to components 600A illustrated in FIG. 6A.

Figure 7:
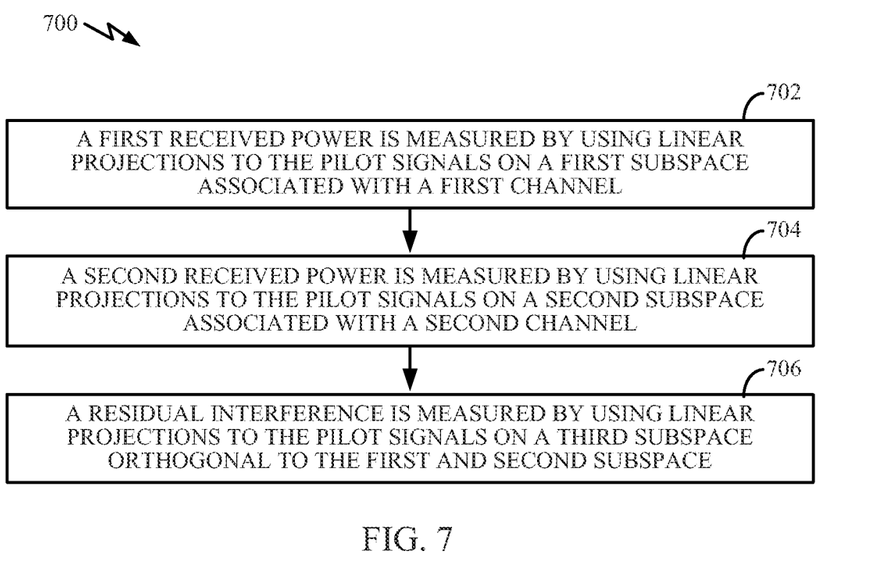
FIG. 7 illustrates example operations that may be performed at a user terminal for detecting single-user communication mode or multi-user communication mode in accordance with certain aspects of the present disclosure.

As illustrated in FIG. 7, at 702, a UE may measure a first received power by using linear projections to the pilot signals on a first subspace associated with a first channel. At 704, the UE may measure a second received power by using linear projections to the pilot signals on a second subspace associated with a second channel. At 706, the UE may measure a residual interference by using linear projections to the pilot signals on a third subspace orthogonal to the first and second subspace.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, and c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

For example, the means for measuring may comprise an application specific integrated circuit, e.g., the processor 270 from FIG. 2 of the mobile device 250, the processor 304 from FIG. 3 of the wireless device 302, or the module 510 from FIG. 5 of the UE 504. The means for determining may comprise an application specific integrated circuit, e.g., the processor 270 of the mobile device 250, the processor 304 of the wireless device 302, or the module 512 from FIG. 5 of the UE 504. The means for applying may comprise an application specific integrated circuit, e.g., the processor 270 of the mobile device 250, or the processor 304 of the wireless device 302. The means for summing may comprise an adder, e.g., the processor 270 of the mobile device 250, or the processor 304 of the wireless device 302. The means for scaling may comprise an application specific integrated circuit, e.g., the processor 270 of the mobile device 250, or the processor 304 of the wireless device 302. The means for updating may comprise a subtractor, e.g., the processor 270 of the mobile device 250, or the processor 304 of the wireless device 302.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, comprising:
   measuring, at a first apparatus based on received pilot signals, a first receive power corresponding to a first channel associated with the first apparatus;
   measuring, at the first apparatus based on the received pilot signals, a second receive power corresponding to a second channel associated with at least one potentially present second apparatus;
   measuring a residual interference at the first apparatus based on the received pilot signals; and
   selecting one of a multi-user (MU) detection or a single-user (SU) detection for estimating data received at the first apparatus, wherein the selecting is based on at least one of the first receive power, the second receive power and the residual interference, and wherein the MU detection is selected if a ratio of the first receive power to a sum of the second receive power and the residual interference is greater than a threshold.

2. The method of claim 1, wherein the MU detection is selected if a ratio of the second receive power to the residual interference is greater than a threshold.

3. The method of claim 1, further comprising applying the selected one of the MU detection and the SU detection.

4. The method of claim 1, wherein:
the first receive power is measured by using linear projections to the pilot signals on a first subspace associated with the first channel;
the second receive power is measured by using linear projections to the pilot signals on a second subspace associated with the second channel; and
the residual interference is measured by using linear projections to the pilot signals on a third subspace orthogonal to the first and second subspace.

5. The method of claim 4, wherein:
the first subspace depends on at least one of an estimated signal-to-noise ratio (SNR) associated with the first channel, an estimated Doppler spread of the first channel and an estimated delay spread of the first channel; and
the second subspace depends on at least one of an estimated SNR associated with the second channel, an estimated Doppler spread of the second channel and an estimated delay spread of the second channel.

6. The method of claim 4, wherein:
the first subspace is selected such that an energy of a first transmission beam associated with the first channel exceeds a first threshold within the first subspace; and
the second subspace is selected such that an energy of a second transmission beam exceeds a second threshold within the second subspace, the second beam being associated with one of the at least one potentially present second apparatus.

7. The method of claim 4, further comprising:
summing squared norms of the pilot signals along basis of the first subspace to obtain the first receive power;
summing squared norms of the pilot signals along basis of the second subspace to obtain the second receive power; and
summing squared norms of the pilot signals along basis of the third subspace to obtain the residual interference.

8. The method of claim 1, further comprising:
scaling the residual interference;
updating the first receive power by subtracting the scaled residual interference from the measured first receive power; and
updating the second receive power by subtracting the scaled residual interference from the measured second receive power.

9. An apparatus for wireless communications, comprising:
at least one processor configured to:
measure, based on received pilot signals, a first receive power corresponding to a first channel associated with the apparatus;
measure, based on the received pilot signals, a second receive power corresponding to a second channel associated with at least one potentially present other apparatus;
measure a residual interference based on the received pilot signals; and
select one of a multi-user (MU) detection or a single-user (SU) detection for estimating data received at the apparatus, based on at least one of the receive power, the second receive power and the residual interference, wherein the MU detection is selected if a ratio of the first receive power to a sum of the second receive power and the residual interference is greater than a threshold; and
a memory coupled to the at least one processor.

10. The apparatus of claim 9, wherein the at least one processor is further configured to select the MU detection, if a ratio of the second receive power to the residual interference is greater than a threshold.

11. The apparatus of claim 9, wherein the at least one processor is further configured to apply the selected one of the MU detection and the SU detection.

12. The apparatus of claim 9, wherein the at least one processor is further configured to:
use linear projections to the pilot signals on a first subspace associated with the first channel;
use linear projections to the pilot signals on a second subspace associated with the second channel; and
use linear projections to the pilot signals on a third subspace orthogonal to the first and second subspace.

13. The apparatus of claim 12, wherein:
the first subspace depends on at least one of an estimated signal-to-noise ratio (SNR) associated with the first channel, an estimated Doppler spread of the first channel and an estimated delay spread of the first channel; and
the second subspace depends on at least one of an estimated SNR associated with the second channel, an estimated Doppler spread of the second channel and an estimated delay spread of the second channel.

14. The apparatus of claim 12, wherein:
the first subspace is selected such that an energy of a first transmission beam associated with the first channel exceeds a first threshold within the first subspace; and
the second subspace is selected such that an energy of a second transmission beam exceeds a second threshold within the second subspace, the second beam being associated with one of the at least one potentially present other apparatus.

15. The apparatus of claim 12, wherein the at least one processor is further configured to:
sum squared norms of the pilot signals along basis of the first subspace to obtain the first receive power;
sum squared norms of the pilot signals along basis of the second subspace to obtain the second receive power; and
sum squared norms of the pilot signals along basis of the third subspace to obtain the residual interference.

16. The apparatus of claim 9, wherein the at least one processor is further configured to:
scale the residual interference;
update the first receive power by subtracting the scaled residual interference from the measured first receive power; and
update the second receive power by subtracting the scaled residual interference from the measured second receive power.

17. An apparatus for wireless communications, comprising:
means for measuring, based on received pilot signals, a first receive power corresponding to a first channel associated with the apparatus;
means for measuring, based on the received pilot signals, a second receive power corresponding to a second channel associated with at least one potentially present other apparatus;
means for measuring a residual interference based on the received pilot signals; and means for selecting one of a multi-user (MU) detection or a single-user (SU) detection for estimating data received at the apparatus, based on at least one of the receive power, the other receive power and the residual interference, wherein the means for selecting is configured to select the MU detection if a ratio of the first receive power to a sum of the second receive power and the residual interference is greater than a threshold.

18. The apparatus of claim 17, wherein the means for selecting is further configured to select the MU detection if a ratio of the second receive power to the residual interference is greater than a threshold.

19. The apparatus of claim 17, further comprising means for applying the selected one of the MU detection and the SU detection.

20. The apparatus of claim 17, wherein:
the first receive power is measured by using linear projections to the pilot signals on a first subspace associated with the first channel;
the second receive power is measured by using linear projections to the pilot signals on a second subspace associated with the second channel; and
the residual interference is measured by using linear projections to the pilot signals on a third subspace orthogonal to the first and second subspace.

21. The apparatus of claim 20, wherein:
the first subspace depends on at least one of an estimated signal-to-noise ratio (SNR) associated with the first channel, an estimated Doppler spread of the first channel and an estimated delay spread of the first channel; and
the second subspace depends on at least one of an estimated SNR associated with the second channel, an estimated Doppler spread of the second channel and an estimated delay spread of the second channel.

22. The apparatus of claim 20, wherein:
the first subspace is selected such that an energy of a first transmission beam associated with the first channel exceeds a first threshold within the first subspace; and
the second subspace is selected such that an energy of a second transmission beam exceeds a second threshold within the second subspace, the second beam being associated with one of the at least one potentially present other apparatus.

23. The apparatus of claim 20, further comprising:
means for summing squared norms of the pilot signals along basis of the first subspace to obtain the first receive power;
means for summing squared norms of the pilot signals along basis of the second subspace to obtain the second receive power; and
means for summing squared norms of the pilot signals along basis of the third subspace to obtain the residual interference.

24. The apparatus of claim 17, further comprising:
means for scaling the residual interference;
means for updating the first receive power by subtracting the scaled residual interference from the measured first receive power; and
means for updating the second receive power by subtracting the scaled residual interference from the measured second receive power.

25. A computer-program product for wireless communications, comprising a non-transitory computer-readable storage medium comprising:

instructions for causing a computer to measure, at a first apparatus based on received pilot signals, a first receive power corresponding to a first channel associated with the first apparatus;
instructions for causing the computer to measure, at the first apparatus based on the received pilot signals, a second receive power corresponding to a second channel associated with at least one potentially present second apparatus;
instructions for causing the computer to measure a residual interference at the first apparatus based on the received pilot signals; and
instructions for causing the computer to select one of a multi-user (MU) detection or a single-user (SU) detection for estimating data received at the first apparatus based on at least one of the first receive power, the second receive power and the residual interference, wherein the MU detection is selected if a ratio of the first receive power to a sum of the second receive power and the residual interference is greater than a threshold.

26. The computer-program product of claim 25, wherein the non-transitory computer-readable storage medium further comprises instructions for causing the computer to select the MU detection if a ratio of the second receive power to the residual interference is greater than a threshold.

27. The computer-program product of claim 25, wherein the non-transitory computer-readable storage medium further comprises instructions for causing the computer to apply the selected one of the MU detection and the SU detection.

28. The computer-program product of claim 25, wherein:
the first receive power is measured by using linear projections to the pilot signals on a first subspace associated with the first channel;
the second receive power is measured by using linear projections to the pilot signals on a second subspace associated with the second channel; and
the residual interference is measured by using linear projections to the pilot signals on a third subspace orthogonal to the first and second subspace.

29. The computer-program product of claim 28, wherein:
the first subspace depends on at least one of an estimated signal-to-noise ratio (SNR) associated with the first channel, an estimated Doppler spread of the first channel and an estimated delay spread of the first channel; and
the second subspace depends on at least one of an estimated SNR associated with the second channel, an estimated Doppler spread of the second channel and an estimated delay spread of the second channel.

30. The computer-program product of claim 28, wherein:
the first subspace is selected such that an energy of a first transmission beam associated with the first channel exceeds a first threshold within the first subspace; and
the second subspace is selected such that an energy of a second transmission beam exceeds a second threshold within the second subspace, the second beam being associated with one of the at least one potentially present second apparatus.

31. The computer-program product of claim 28, wherein the non-transitory computer-readable storage medium further comprises:
instructions for causing the computer to sum squared norms of the pilot signals along basis of the first subspace to obtain the first receive power;
instructions for causing the computer to sum squared norms of the pilot signals along basis of the second subspace to obtain the second receive power; and instructions for causing the computer to sum squared norms of the pilot signals along basis of the third subspace to obtain the residual interference.

32. The computer-program product of claim 25, wherein the non-transitory computer-readable storage medium further comprises:
- instructions for causing the computer to scale the residual interference;
- instructions for causing the computer to update the first receive power by subtracting the scaled residual interference from the measured first receive power; and
- instructions for causing the computer to update the second receive power by subtracting the scaled residual interference from the measured second receive power.

* * * * *